Sept. 4, 1962  J. C. LOUTON, JR., ETAL  3,052,138
SPEED REDUCING GEARING
Filed April 11, 1960
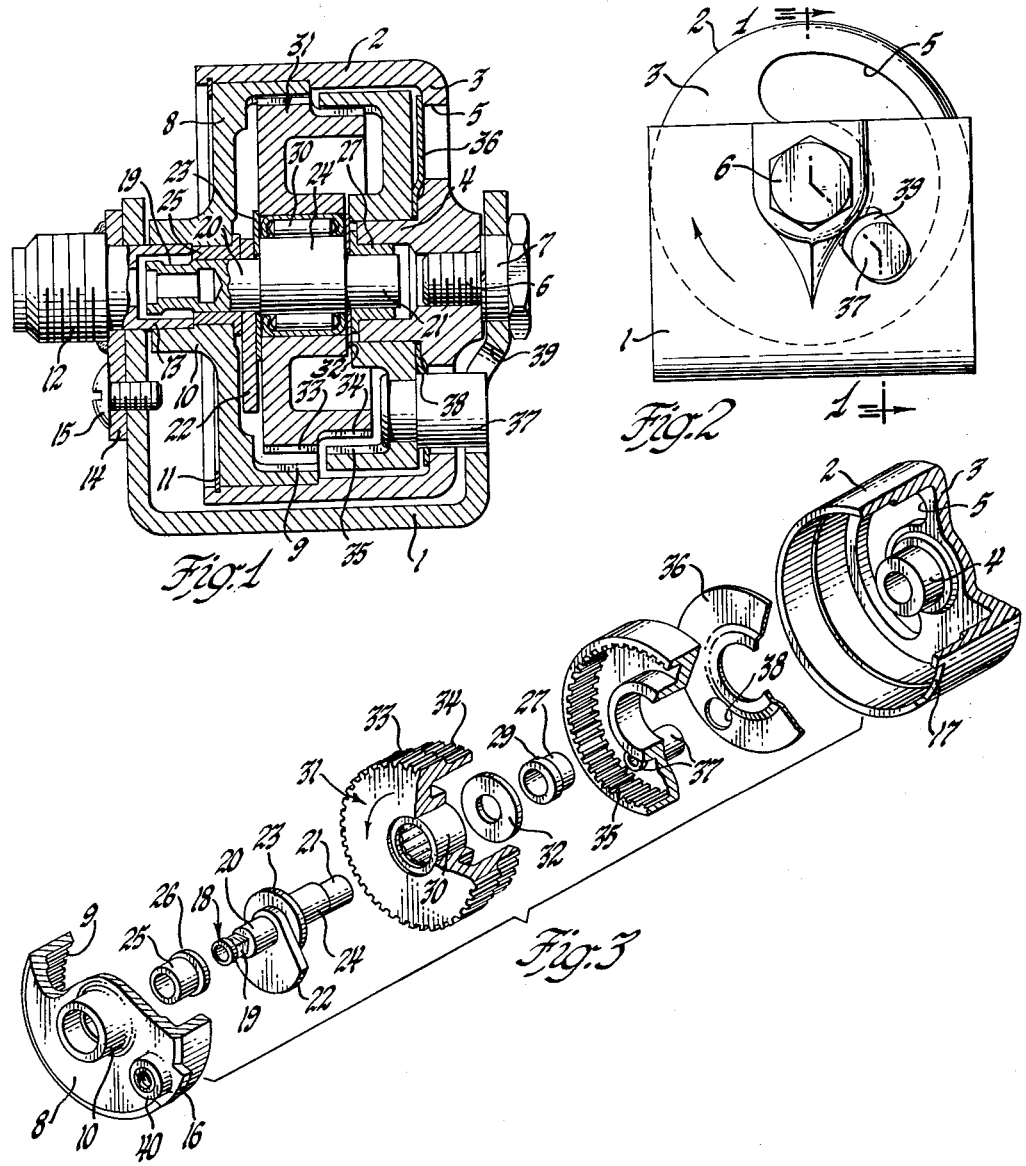
INVENTORS
James C. Louton, Jr. &
BY Claud S. Semar
R. L. Spencer
ATTORNEY

United States Patent Office 3,052,138
Patented Sept. 4, 1962

3,052,138
SPEED REDUCING GEARING
James C. Louton, Jr., Utica, and Claud S. Semar, Birmingham, Mich., assignors to General Motors Corporation, Detroit, Mich., a corporation of Delaware
Filed Apr. 11, 1960, Ser. No. 21,514
6 Claims. (Cl. 74—805)

This invention relates to gearing mechanism and more particularly to a conjugate epicyclic gearing arrangement adapted to provide a very large gear reduction between an input member and an output member.

An object of this invention is to provide a speed reduction gearing capable of providing a very large speed reduction and of very compact design for use in applications where space limitations are critical.

Another object of this invention is to provide a speed reducing gearing having an oscillating pinion gear having two sets of gear teeth, each set of which is in mesh with a different ring gear.

An additional object of this invention is to provide epicyclic gearing incorporating involute spline tooth form allowing multiple teeth engagement and small package size for a given desired greater reduction and high load capacity.

A further object of this invention is to provide a gear reducer unit incorporating an oscillating pinion gear wherein the pinion gear is provided with two sets of gear teeth of different diameter and in mesh with different ring gears, and wherein there is provided a single element for preventing rotation of one ring gear and for limiting the range of rotation of the output member of the gear reducer.

These and other objects and advantages of this invention will be apparent from the following description and claims, taken in conjunction with the accompanying drawings, in which:

FIGURE 1 is a sectional view through a transmission assembly taken along the line 1—1 of FIGURE 2.

FIGURE 2 is an end view of the gear unit showing the gear unit mounted on a suitable support structure.

FIGURE 3 is an exploded view of the embodiment of FIGURE 1.

Referring initially to FIGURE 1, there is shown a support member 1 having a housing 2 supported for rotation thereon. Housing 2 is formed to a cup-shape having an end wall 3 with a boss 4 thereon extending inwardly into the housing. End wall 3 is provided with an arcuate slot 5 and is supported for rotation in support member 1 by means of a suitable screw 6. Screw 6 provides a bearing surface 7 contracting support member 1 and rotates with housing 2. The open end of housing 1 is closed off by means of an end cap 8 having a ring gear 9 formed integrally therewith and a boss 10 formed thereon. End cap 8 is retained on housing 2 by means of a suitable snap ring 11. A hollow trunnion 12 is provided with a hollow sleeve 13 extending into boss 10 and is held against rotation by means of a retainer 14 welded to trunnion 12 and secured to support member 1 by means of a screw 15. Housing 2 is supported for rotation in support 1 at the end of the housing adjacent trunnion 12 by means of sleeve 13 and axially extending boss 10 on end cap 8. The end cap 8 is fixed for rotation with housing 2 by means of an upstanding lug 16 best shown in FIGURE 3, the lug 16 extending radially outwardly beyond ring gear 9 and fitting into a slot 17 in housing 2.

A power input shaft 18 is provided with a hollow portion having squared surfaces 19 adapted to receive the squared off tip of a flexible shaft (not shown) and driven by an electric motor, not shown. Power input shaft 18 is provided with concentric bearing surfaces 20 and 21, a counterweight 22, an upstanding spacer flange 23 and an eccentric cam 24. Bearing surface 20 of shaft 18 is supported at one end by means of a bushing 25 in boss 10, the bushing 25 having an upstanding flange 26 serving to space the counterweight 22 from end cap 8. The concentric surface 21 of shaft 18 is supported in a bushing 27 carried by an axially extending boss 4 on end wall 3, the bushing 27 having an upstanding spacer flange 29 thereon. A needle bearing 30 on eccentric cam 24 supports a pinion gear 31 thereon, there being a washer 32 disposed between the end of needle bearing 30, the hub of pinion gear 31 and the flange 29 on bushing 27. Pinion gear 31 is provided with two sets of gear teeth 33 and 34 of different diameter. Gear set 33 comprising 40 teeth mesh with ring gear 9 having 42 teeth. Gear set 34 comprising 37 teeth mesh with a second ring gear 35 having 39 teeth. The gear 35 is supported upon axially extending boss 4 on wall 3. An annular seal 36 is disposed between ring gear 35 and end wall 3 spaces the gear from end wall 3 and prevents leakage of lubricant through arcuate slot 5. A pin 37 fixed to ring gear 35 extends through an opening 38 in seal 36, through arcuate slot 5, and through an opening 39 in support member 1. In this manner, ring gear 35 is pinned against rotation. A boss 40 (see FIGURE 3) on end cap 8 constitutes the power takeoff member of the unit. Boss 40 may be operatively connected to suitable linkage to be actuated such as a vehicle seat elevator linkage or a door window operating linkage, not shown. Pin 37 and arcaute slot 5 also cooperate to limit the permissible angular rotation of housing 2. This is of advantage in installations such as vehicle seat adjusters and window lifts where a predetermined limited range of motion is desired. Pin 37 cooperates with support member 1 to prevent rotation of ring gear 35 and also cooperates with slot 5 to limit the permissible range of rotation of housing 2. A boss (not shown) similar to boss 40 may be provided on end cap 8 exactly opposite and radially aligned with boss 40 for connection to seat adjuster linkage (not shown) to prevent binding.

In the event that power input shaft 18 is rotated clockwise, ring gear 9 and housing 2 will be rotated counterclockwise at greatly reduced speed of rotation with respect to the speed of rotation of shaft 19, the gear reduction being of the order of 259 to 1. Rotation of shaft 18 causes eccentric cam surface 24 to rotate about the normal axis of rotation of shaft 18, thereby imparting an oscillating motion to pinion gear 31, and the two sets of gear teeth 33 and 34 formed on the pinion 31. The gear set 34 having the lesser number of teeth (37) react against fixed ring gear 35 having a total of 39 teeth. Since the reaction of teeth 34 causes no rotation of ring gear 35, the forces are carried to the gear set 33 having a total of 40 teeth. This causes ring gear 9 having 42 teeth to rotate in response to oscillation of pinion gear 31, the ring gear causing rotation of housing 2. Rotation of ring gear 9 and end cap 8 fixed to gear 9 causes change in the position of boss 40 on end cap 8 and the linkage (not shown) connected thereto.

It will be apparent from the foregoing description that the speed reducer gearing assembly is of a very compact design and is capable of very large gear reduction. The assembly is particularly adapted for use in confined space such as beneath a vehicle seat for adjusting the seat position or in a vehicle door for operating door window lift mechanism.

We claim:
1. In a transmission, a rotatable housing, an end cap for said housing and fixed to said housing for rotation therewith, said end cap cooperating with said housing to form a closed chamber, a ring gear fixed to said end cap and disposed in said chamber, a power input shaft supported for rotation in said end cap and said housing and driving an eccentric cam disposed in said chamber, a second gear supported on said housing disposed in said chamber, an arcuate slot in said housing, means for preventing rotation of said second ring gear and for permitting limited angular rotation of said housing including a member fixed to said second ring gear extending through said slot to the exterior of said chamber and fixed against rotation exterior of said chamber, a pinion gear having a first set of teeth in mesh with said first ring gear and a second set of teeth in mesh with said second ring gear, said pinion gear being supported upon and driven by said eccentric cam.

2. In a transmission, a rotatable housing, a ring gear forming an end cap for said housing and fixed to said housing for rotation therewith, a second ring gear supported on said housing, a slot in said housing, a pin carried by said second ring gear and extending through said slot, means exterior of said housing for preventing rotation of said pin and second ring gear, a rotatable power input shaft, an eccentric cam driven by said power input shaft, and a pinion gear supported upon and driven by said eccentric cam, said pinion gear having a first set of teeth in mesh with said first mentioned ring gear and a second set of teeth in mesh with said first mentioned ring gear and a second set of teeth in mesh with said second ring gear.

3. In a transmission, a rotatable housing, an axially extending boss in said housing, an arcuate slot in said housing, a first ring gear carried by said housing and rotatable therewith, a second ring gear supported upon said boss, a pin carried by said second ring gear and extending through said arcuate slot, means for preventing rotation of said pin and said second ring gear, said pin and said slot cooperating to limit the range of angular rotation of said housing, a power input shaft supported for rotation in said first ring gear and said axially extending boss, an eccentric cam driven by said power input shaft, and a pinion gear supported upon and driven by said eccentric cam, said pinion gear having a first set of teeth in mesh with said first ring gear and a second set of teeth in mesh with said second ring gear.

4. In a transmission, a support member fixed against rotation, a housing rotatably supported in said support member for limited angular rotation with respect to said support member, a reaction ring gear disposed within said housing and supported upon said housing, an arcuate slot in said housing, a seal disposed between said ring gear and said arcuate slot having an opening therethrough, an opening in said support member, a pin carried by said ring gear and extending through both of said openings and said slot for preventing rotation of said ring gear, said seal and said rotatable housing being rotatable as a unit with respect to said support member, said pin and said slot cooperating to limit the angular rotation of said housing with respect to said support member, a power input shaft supported for rotation in said rotatable housing, an eccentric cam rotatable with said power input shaft, a pinion member supported upon said cam, first and second sets of gear teeth carried by said pinion member, a second ring gear fixed to said rotatable housing for rotation therewith, said first set of gear teeth of said pinion gear being in mesh with said first ring gear, said second set of pinion gear teeth being in mesh with said second set of gear teeth, and a power take-off member carried by said second ring gear.

5. In a transmission, a U-shaped support member fixed against rotation, a cup-shaped housing having a base and an open end, an arcuate slot in said base, means cooperating with said base of said housing for supporting said housing for rotation in said support member, an end cap fixed to said housing for closing off the open end of said housing, means cooperating with said support member and said end cap for rotatably supporting said end cap in said support member, an inwardly extending boss on the base of said housing, a ring gear supported upon said boss, a seal disposed between said ring gear and said arcuate slot, an opening through said seal, a second opening through said support member, a pin extending through both of said openings for preventing rotation of said ring gear and said seal with respect to said housing, said pin extending through said arcuate slot, a power input shaft rotatably supported in said boss and said end cap, an eccentric cam on said input shaft rotatable therewith, a pinion gear supported upon said eccentric cam, said cam being rotatable with respect to said pinion gear, a first set of gear teeth on said pinion gear in mesh with said ring gear, said ring gear being provided with a greater number of gear teeth than the teeth of said first set of teeth on said pinion gear, a second set of gear teeth on said pinion gear, a set of gear teeth on said end cap in mesh with said second set of pinion gear teeth, the gear teeth on said end cap being greater in number than those on said second set of pinion gear teeth, said pin and said arcuate slot cooperating with each other to limit the angular rotation of said housing with respect to said support member both clockwise and counterclockwise, and a power take-off member carried by said end cap and rotatable therewith.

6. In a transmission, a U-shaped support member fixed against rotation and presenting a pair of upstanding spaced walls, a cup-shaped housing having a base and an open end, an end cap carried by said housing fixed to said housing for rotation therewith and closing off said open end to form with said housing a closed chamber, means rotatably supporting the base of said housing in one wall of said support member, means supporting said end cap for rotation in the other wall of said support member, an arcuate slot in said base of said housing, an opening in said one wall of said support member, an axially extending hollow boss on said one wall of said support member extending into said chamber, a first ring gear in said chamber supported on said boss, a seal disposed between said ring gear and said arcuate slot, an opening through said seal, a pin extending through said opening in said one end wall, said arcuate slot, and said seal opening for preventing rotation of said ring gear and seal with respect to said support member and for permitting limited angular rotation of said housing with respect to said support member, said pin and said arcuate slot cooperating to limit the permissible angular rotation of said housing with respect to said support member, a power input shaft in said chamber having an eccentric cam formed thereon, said shaft having one end thereof rotatably supported in said boss and a second portion thereof rotatably supported in said end cap, a pinion gear disposed in said chamber supported upon said eccentric cam, said cam being rotatable with respect to said pinion gear, a first set of gear teeth on said pinion gear in mesh with said ring gear, a second ring gear formed on said end cap and disposed in said chamber, a second set of gear teeth on said pinion gear in mesh with said ring gear, and a power take-off member on said end cap.

References Cited in the file of this patent
UNITED STATES PATENTS

| | | |
|---|---|---|
| 2,303,365 | Karlsen | Dec. 1, 1942 |
| 2,434,082 | Sharpe | Jan. 6, 1948 |
| 2,460,629 | Farwick | Feb. 1, 1949 |
| 2,881,619 | Fox et al. | Apr. 14, 1959 |
| 2,991,662 | Werner | July 11, 1961 |